(12) United States Patent
Kurtscheid et al.

(10) Patent No.: US 8,831,390 B2
(45) Date of Patent: Sep. 9, 2014

(54) FIBER-OPTIC CABLE

(71) Applicant: LIOS Technology GmbH, Köln (DE)

(72) Inventors: Friedhelm Kurtscheid, Köln (DE); Wieland Hill, Odenthal (DE); Martin Fromme, Köln (DE)

(73) Assignee: Lios Technology GmbH, Cologne (DE)

( * ) Notice: Subject to any disclaimer, the term of this patent is extended or adjusted under 35 U.S.C. 154(b) by 49 days.

(21) Appl. No.: 13/622,709

(22) Filed: Sep. 19, 2012

(65) Prior Publication Data

US 2013/0071074 A1 Mar. 21, 2013

Related U.S. Application Data

(60) Provisional application No. 61/536,809, filed on Sep. 20, 2011.

(51) Int. Cl.
*G02B 6/44* (2006.01)

(52) U.S. Cl.
CPC ...................................... *G02B 6/443* (2013.01)
USPC ............................ 385/101; 385/107; 385/106

(58) Field of Classification Search
CPC .... G02B 6/443; G02B 6/4432; G02B 6/4434; G02B 6/4429; G02B 6/4427
USPC ............ 385/104, 100, 102, 106, 13, 101, 107
See application file for complete search history.

(56) References Cited

U.S. PATENT DOCUMENTS

| | | | |
|---|---|---|---|
| 4,522,464 A | 6/1985 | Thompson et al. | |
| 5,125,061 A * | 6/1992 | Marlier et al. | 385/101 |
| 5,125,062 A * | 6/1992 | Marlier et al. | 385/101 |
| 6,349,161 B1 * | 2/2002 | Gleason et al. | 385/113 |
| 7,324,730 B2 | 1/2008 | Varkey et al. | |
| 8,452,142 B1 * | 5/2013 | Laws et al. | 385/101 |
| 2002/0126967 A1 * | 9/2002 | Panak et al. | 385/101 |
| 2002/0126969 A1 | 9/2002 | Bonja et al. | |
| 2006/0120675 A1 | 6/2006 | Goldner et al. | |

FOREIGN PATENT DOCUMENTS

| | | |
|---|---|---|
| DE | 10 2008 026 082 | 12/2009 |
| EP | 1099 133 | 5/2001 |
| GB | 2 368 921 | 5/2002 |
| WO | 2011037974 A2 | 3/2011 |

* cited by examiner

*Primary Examiner* — Ellen Kim
(74) *Attorney, Agent, or Firm* — Cohen & Hildebrand, PLLC

(57) ABSTRACT

Fiber-optic cable useful in a borehole is provided, with at least one optical waveguide (2), at least one metallic tube (1) which at least partially surrounds the at least one optical waveguide (2), and at least one additional layer, which at least partially surrounds the at least one metallic tube (1). The fiber-optic cable includes a separator which contributes to or cause mechanical decoupling of individual components of the fiber-optic cable.

16 Claims, 4 Drawing Sheets

FIBER-OPTIC CABLE

CROSS-REFERENCE TO RELATED APPLICATION

This application claims the benefit of U.S. Provisional Patent Application No. 61/536,809, filed Sep. 20, 2011, the entirety of which is hereby incorporated by reference into this application.

BACKGROUND OF THE INVENTION (1) Field of the Invention

The present invention relates to a fiber-optic cable, in particular for use in a borehole, according to the preamble of claim 1. The fiber-optic cable is hereinafter also referred to as the wireline cable.

Definitions: The terms light, optical radiation or optical signal used in the following refer to electromagnetic radiation in the optical spectral range, in particular from XUV to FIR. Accordingly, within the context of this application, a light waveguide is used as a transmission medium for electromagnetic radiation in the optical spectral range.

(2) Description of Related Art

In oil and natural gas wells, multi-functional mobile tools ("tractors") are used for sensory as well as for maintenance purposes. These are conventionally supplied with energy over conventional wireline cable structures. Hitherto, wireline cables with optical waveguides integrated in a stainless steel tube are inadequate in practical use with distributed fiber-optic sensors because different elongation coefficients of cables and tubes during insertion and extraction of the cable, as well as extreme longitudinal pulling forces and torsion can occur when driving the tractor. This can cause local mechanical deformations and tearing of the tube. An alternative version without a tube enclosing the optical waveguide for hermetic protection is also known. The resulting proposed structures can indeed allow greater elongation. However, it can be expected that, for example, irreversible elongation can occur when the longitudinal tension and torsional forces are applied, which cause local stress (locally increased attenuation) on the sensor fibers. In addition, by eliminating a tube enclosing the optical waveguides, the waveguides are not hermetically protected, which is disadvantageous with respect to accelerated aging effects (hydrogen ingression, high temperatures in the borehole from 200° C. to 300° C. or higher) in this application.

Both of the above-mentioned variants have the disadvantage that mechanical forces (longitudinal tensile forces and torsion) during continuous operation of the wireline cable may cause temporary or permanent locally different impairment of the sensory properties of the optical waveguides as fiber-optic sensors distributed over various locations. This affects the quality of calibration and measurement resolution of fiber-optic method for measurement of physical quantities.

Wassink, Sandra, EX-Journal 2011, page 34-41, "Wireline— . . . " describes the advantages of wireline technology (from page 38) in land-based oil and natural gas production. The application "Wireline" implements technical systems which allow measurements within a borehole during ongoing production.

WO 2011/037974 A2 describes the wireline technology with an extension to additional maintenance tasks within a borehole. A propulsion unit (tractor) travels along the subterranean borehole to perform different tasks (maintenance, measurement), wherein power is supplied and data are transferred via the wireline cable.

The tractor and the wireline cable remain permanently in the borehole and, if necessary, the tractor can be pulled back with the wireline cable to the starting point of the borehole. The optical system (measurement) of physical variables such as temperature is simultaneously implemented by using optical fibers within the wireline cable.

WO 2011/037 974 A2 addresses in this context the requirements for the torsion properties, the cable weight and the frictional resistance of the wireline cable. For this purpose, different design solutions of wireline cables are illustrated in this document, which have improved torsion properties (torque balanced) compared to the existing wireline cables.

To reduce the frictional resistance, an additional smooth outer jacket is implemented on the wireline cable. However, the question remains to which extent smooth characteristics of a thin plastic jacket can be maintained under adverse conditions. Likewise, there is the risk that the jacket can wear off and/or tear.

In U.S. Pat. No. 7,324,730 B2, it is demonstrated that the use of stainless steel tubes for the protection of optical fibers in the wireline cable application is not or only barely suitable. Due to high cable elongations of wireline cable in an application, stainless steel tubes can be at risk of deformations. In the worst case, the optical fibers within the steel tubes are also damaged.

U.S. Pat. No. 7,324,730 B2 discloses novel constructive solutions without metallic tubes as direct protection for the optical fibers. These solutions are intended to prevent damage to the optical fibers with greater cable elongation.

According to the aforementioned findings, the structures disclosed in WO 2011/037974 A2 do not disclose additional constructive features that would be able to adequately protect a stainless steel tube at high elongations of the wireline cable against deformation or damage.

Accordingly, no suitable precautions for the safe use of stainless steel tubes in the wireline cable application exist in conjunction with the portable use of a tractor. It is therefore desirable to permanently enable the distributed fiber-optic measurement of physical parameters along the cable line in the above application with a suitable construction of a wireline cable in a tube, for example made of stainless steel, and at least one integrated optical waveguide and to minimize the aforementioned disadvantages.

A fiber-optic cable of the type mentioned above is known from U.S. 2006/0120675 A1 The cable disclosed therein includes a stainless steel tube with an optical fiber disposed therein. In addition, a reinforcement layer made of aramide fibers is arranged outside of the tube and Teflon layers outside of the reinforcing layer to reduce friction.

BRIEF SUMMARY OF THE INVENTION

The underlying problem to be solved by the present invention is to provide a fiber-optic cable of the aforementioned type, in which the risk of damage of the integrated tube is reduced.

This is achieved by the invention with a fiber-optic cable of the aforementioned type having the characterizing features of claim 1. The dependent claims relate to preferred embodiments of the invention.

The fiber-optic cable includes separating means which can contribute to or may cause mechanical decoupling of individual components of the fiber-optic cable. The mechanical decoupling of individual components of the cable from one another reduces the risk of damage to the integrated tube, particularly when the separating means can contribute to or cause mechanical decoupling of the at least one tube from the at least one additional layer.

For example, the separating means may be provided in form of at least one foil arranged radially between the at least one tube and the at least one additional layer.

The at least one additional layer may be formed as an electrical conductor or as reinforcing means. Such reinforcing means can absorb tensile forces and may include for example fibers, in particular aramide fibers, or may consist of fibers, particularly aramide fibers. Alternatively, the reinforcing means may be formed as a reinforcement, especially as ordinary lay.

Especially when the separating means are arranged between the at least one tube and the reinforcing means, the resulting mechanical decoupling of the tube from the reinforcing means very effectively reduces the risk of damage to the tube.

The separating means may include two foils, between which an additional layer of the cable is arranged. For example, the inner of the two foils may here directly or indirectly surround the tube, whereas the reinforcing means may be arranged between the two foils. In this manner, the tube and the reinforcing means can be mechanically decoupled from the layers or parts of the cable arranged outside the outermost of the two outer foils.

For example, the outermost of the two outer foils may be surrounded by parts of a traction cable, which may preferably be conductive. In this way, on the one hand, power can be supplied via the cable, wherein for example a second conductor may be arranged on the outside of the tube. On the other hand, the outermost of the two outer foils may ensure mechanical decoupling of the inner layers of the cable from the outer traction cable, which can also serve to absorb tensile forces.

Further features and advantages of the present invention become apparent from the following description of preferred embodiments with reference to the accompanying drawings Therein

BRIEF DESCRIPTION OF THE SEVERAL VIEWS OF THE DRAWING(S)

DETAILED DESCRIPTION OF THE INVENTION

Figure 1:
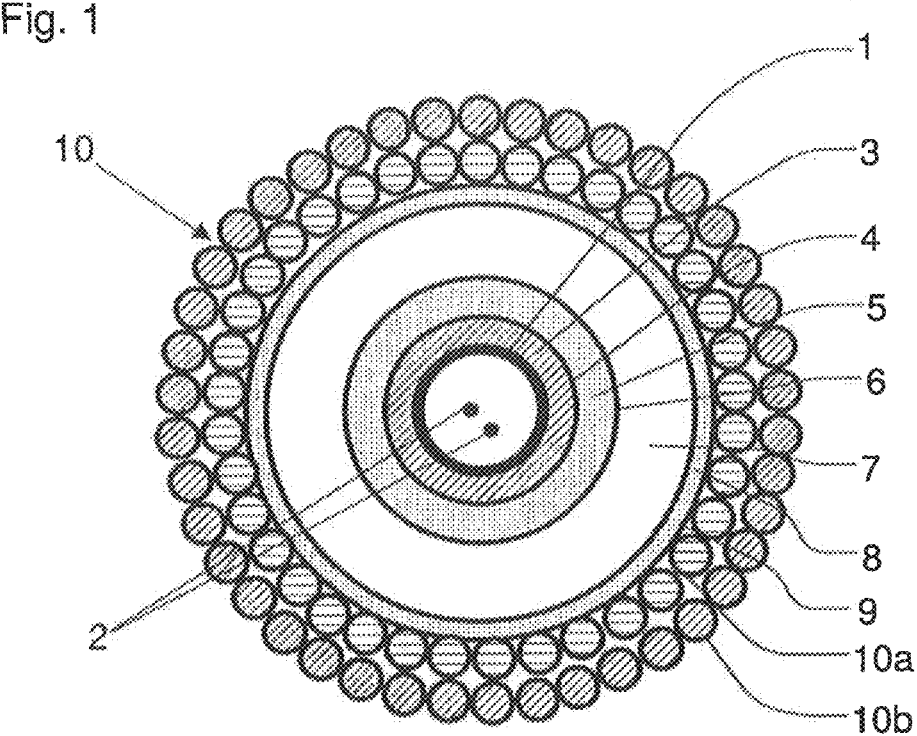
FIG. 1 shows a schematic cross-section through a first embodiment of a fiber-optic cable according to the present invention.

In the figures, identical or functionally identical parts or components are provided with the same reference numerals.

Wireline cables according to the prior art suffer from the risk of damage to the integrated steel tube as a result of elongations.

The invention is intended to show measures for protecting a metallic tube (preferably made of stainless steel, alternatively of nickel alloys, aluminum . . . ), so that the advantages of the hermetically sealed metal tube as an enclosure for optical fibers can be realized in the "Down-hole Wire line Cable Application".

In contrast to the use of optical fibers for communication purposes, special requirements for a mechanically stress-free sensor path exist with the fiber-optic sensor systems (for example, DTS—distributed temperature sensing). Additional temporally or spatially variable losses due to temporary or local mechanical stress can directly affect the measurement of the physical quantity, which may require a recalibration of the measurement system.

The optical fibers should therefore be suitable for use in sensor systems (especially DTS) without being subjected to mechanical stress.

The availability and reliability for using optical fibers is increased and the failure rate is likewise reduced. A service interruption caused by the failure of the optical fibers when operating the down-hole wells should be avoided.

As a first solution approach (FIGS. 1 to 4), a down-hole wireline cable is to be augmented with optical fibers in a protective metal casing (preferably a stainless steel tube).

The original mechanical properties of the down-hole wireline cable should hereby be preserved.

In contrast to the prior art, where mechanical stresses (particularly longitudinal elongation) are problematic when using a metal or stainless steel tube with integrated optical waveguides, suitable constructive measures according to the invention are presented which largely decouple the metal or stainless steel tube from the mechanical loads introduced on the actual wireline cable.

In another solution approach (FIGS. 5 to 7), the modification represents an exchange of the metallic strain relief elements against "low-modulus aramide" fibers.

The longitudinal elongation is sufficiently reduced due to the lower weight and the smaller cable modulus of aramide, thereby eliminating the deformation of the stainless steel tube under tensile load.

The embodiment shown in FIG. 1 includes a metallic tube 1, which is preferably made of stainless steel, or alternatively of nickel alloys or aluminum or aluminum alloys. The tube may be formed as a double-layered, a three-layered or a multi-layered tube. Such configuration is usually mechanically more stable than standard metal tubes and is buckling- and pressure-resistant.

In the illustrated embodiment, two optical waveguides 2 are arranged in the tube 1. It is also possible to provide more or fewer than two optical waveguides 2. Moreover, an additional filler material, such as a gel, may be provided in the cavity of the tube 1.

The optical waveguides 2 can be used for fiber-optic sensor systems for measuring, for example, temperature and/or pressure and/or vibration. The optical waveguides 2 can be single-mode or multi-mode fibers and can be provided with a coating, for example, acrylic, carbon, or preferably polyimide to increase the mechanical, chemical and thermal resistance. The optical waveguides 2 are disposed in the tube 1 with an excess length, wherein the excess length is, for example, one-thousandth of the overall length.

The tube 1 is provided on the outside with a conductor 3, preferably made of copper, alternatively aluminum or other alloys or metals with good conductivity. The conductor 3 is formed as a stranded layer, as a braid or as a foil tape, and serves as an inner conductor for supplying power to the fiber-optic cable. With the configuration as stranded layer, fabric or foil tape, an additional bracing effect as mechanical protection for the tube 1 is obtained.

Alternatively, an electrically conductive fabric/braid, preferably made of copper, and in addition an electrically conductive layer, preferably of copper, may be provided on the tube 1.

The first embodiment further includes a foil 4 arranged outside the conductor 3 as separating means or tape. The foil 4 is preferably made of PTFE. The foil 4 may serve as separating means or separating layer for mechanical decoupling, In addition, longitudinal fibers 5, preferably made of aramide, are provided outside of the foil 4, which operate as reinforcing means or as strain relief elements for the tube 1

Instead of the fibers 5, a two-layer or multi-layer stranding with left-hand and right-hand lay may be provided.

Another foil 6 is provided outside the fibers 5 or outside the two-layer stranding with left-hand and right-hand lay. The other foil 6 can be constructed as tape or be longitudinal, and is preferably made of PTFE. The other foil 6 may also serve as separating means or separating layer for mechanical decoupling.

An insulation 7, in particular a high voltage insulation, is provided outside of the foil 6, which is made in particular from a chemically resistant and temperature-resistant plastic material such as for example fluoropolymer, preferably EPR or ETFE.

Optionally, longitudinal fibers 8, preferably made of aramide, which operate as reinforcing means or as additional strain relief elements for the isolation 7 are arranged outside the insulation 7. Alternatively, a two-layer or multi-layer stranding with left-hand and right-hand lay may be provided.

Also optionally, a tape 9, preferably made of a metal foil, may be disposed outside the longitudinal fibers 8 for protecting the insulation from the inner layer of the traction cable 10 which will be described below.

The traction cable 10 is provided farther on the outside as two-layer reinforcement having in particular has a lay with portions 10*a*, 10*b* having a left-hand and a right-hand lay. Alternatively, a multi-layer structure may be provided in the lay of the traction cable 10. A metallic material, preferably G-GIPS OR GHS-GEIPS, may be used as material for the traction cable 10. When using a metallic material, the traction cable 10 can be used as a return conductor.

Figure 2:
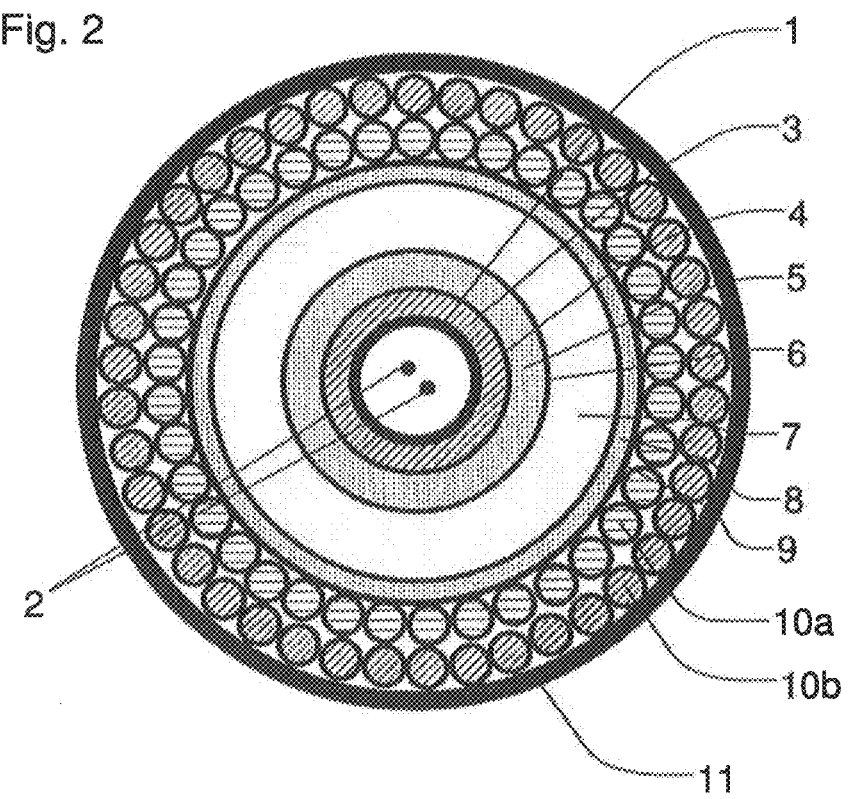
FIG. 2 shows a schematic cross-section through a second embodiment of a fiber-optic cable according to the present invention.

In the embodiment shown in FIG. 2, an outer jacket 11 having a smooth surface and made of chemically resistant and temperature-resistant plastic, for example fluoropolymer, preferably PEEK or ETFE, is likewise arranged outside the traction cable 10.

An outer jacket can additionally be extruded, provided that the requirements for the pressure within down-hole bore and the outer diameter of the wireline cable are satisfied.

The inner members are mechanically decoupled by way of the foils 4, 6, thereby facilitating "slip" of the inner elements under bending and tensile loads.

Assuming that the mechanical loading of the single-layer, double-layer or multi-layer metal tube are in the elastic range, the functionality of the optical fiber 2 can be expected to have no further limitations.

Figure 3:
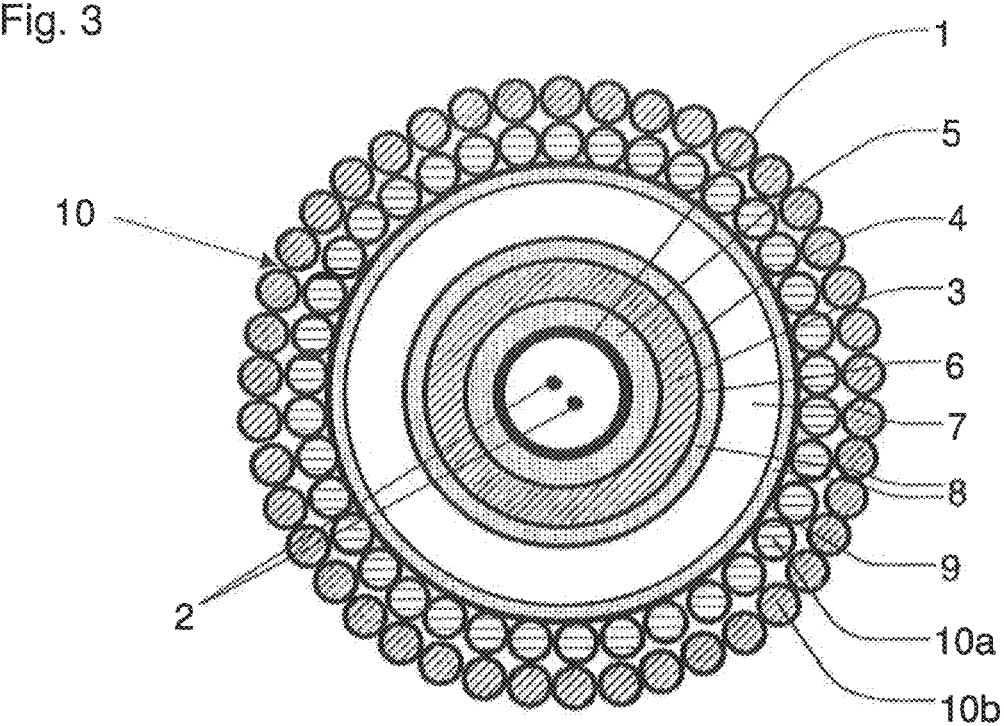
FIG. 3 shows a schematic cross-section through a third embodiment of a fiber-optic cable according to the present invention.

FIG. 3 shows an embodiment with a metallic tube 1, with optical waveguides 2 arranged in their interior, as in the first and second exemplary embodiment. In contrast to these first embodiments, longitudinally extending fibers 5 made preferably of aramide and operating as reinforcing means are arranged on the outside of the tube 1, performing the function of strain relief elements for the tube 1.

Alternatively, a two-or multi-layer stranding with a left-hand lay and a right-hand lay may be also be provided.

In the exemplary embodiment of FIG. 3, a foil 4 serving as separating means or separating layer for mechanical decoupling is disposed on the outside of the fibers 5.

The foil 4 is surrounded by the conductor 3, which in particular has the same properties as the conductor 3 described in connection with FIG. 1.

In the exemplary embodiment according to FIG. 3, an additional foil 6 is disposed outside the conductor 3, which like the foil 6 of the first exemplary embodiment can also serve as separating means or separating layer for mechanical decoupling.

Furthermore, in the exemplary embodiment of FIG. 3, the insulation 7 is disposed outside the foil 6. Optionally, as in the first exemplary embodiment, the longitudinal fibers 8 operating as reinforcing means and the tape 9 are provided outside the insulation 7. However, in the exemplary embodiment according to FIG. 3, comparable longitudinal fibers 8 serving as a reinforcing means may also be provided, as an alternative or in addition, on the inside of the insulation 7.

Like in the first exemplary embodiment, the traction cable 10 continuous on the outside of the tape 9.

Figure 4:
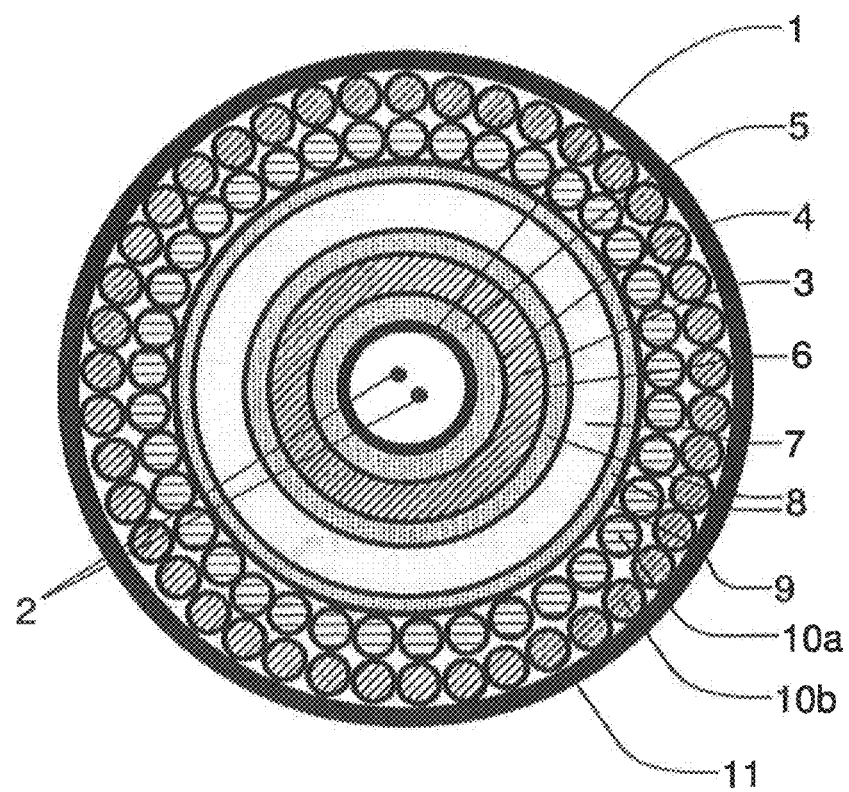
FIG. 4 shows a schematic cross-section through a fourth embodiment of a fiber-optic cable according to the present invention.

An outer jacket 11 is provided in the embodiment shown in FIG. 4, as the embodiment of FIG. 2.

Provided that the requirements for the pressure within down-hole bore and the outer diameter of the wireline cable can be met, this outer jacket 11 may also be extruded.

The elements of the core are mechanically decoupled by way of the structural design of the parts 1 and 3 to 6, thus facilitating "slip" of the core elements against each other under bending and tensile loading, Provided that the mechanical stresses of the tube, in particular the two-layer tube, are in the plastic range, functionality of the optical waveguide 2 without additional limitations can be expected.

Figure 5:
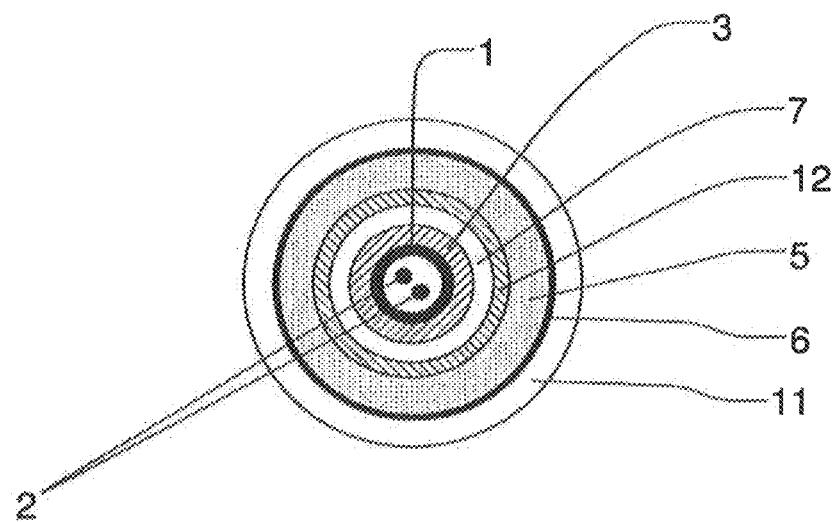
FIG. 5 shows a schematic cross-section through a fifth embodiment of a fiber-optic cable according to the present invention.

FIG. 5 shows an embodiment with a metallic tube 1 with optical fibers 2 arranged in the interior thereof, as in the first to fourth exemplary embodiment. As in the first exemplary embodiment, a conductor 3 which may correspond to the conductor of the first exemplary embodiment is provided on the outside of the tube 1.

Unlike the first exemplary embodiment, in the embodiment of FIG. 5 an insulation 7 which may correspond to the insulation 7 of the first exemplary embodiment is disposed on the outside of the conductor 3.

An additional conductor 12 is arranged on the outside of this isolation 7, which is preferably also made of copper, or alternatively of aluminum or other highly conductive alloys or metals. The conductor 12 is formed as a stranded layer, as a fabric or as a foil tape and serves as a return conductor for the power supply of the fiber-optic cable.

Furthermore, longitudinal fibers 5, preferably made of aramide, which serve as reinforcing means or stress relief elements, are arranged outside of the additional conductor 12.

A foil 6 which is preferably made of PETP and serves as stranding is arranged outside the fibers 5. The foil 6 can serve as separating means or separating layer for mechanical decoupling.

The embodiment of FIG. 5 further includes an outer jacket 11 arranged outside the foil 6 and made of chemically resistant and temperature-resistant plastic, for example fluoropolymer, preferably PEEK or ETFE, with a smooth surface.

Figure 6:
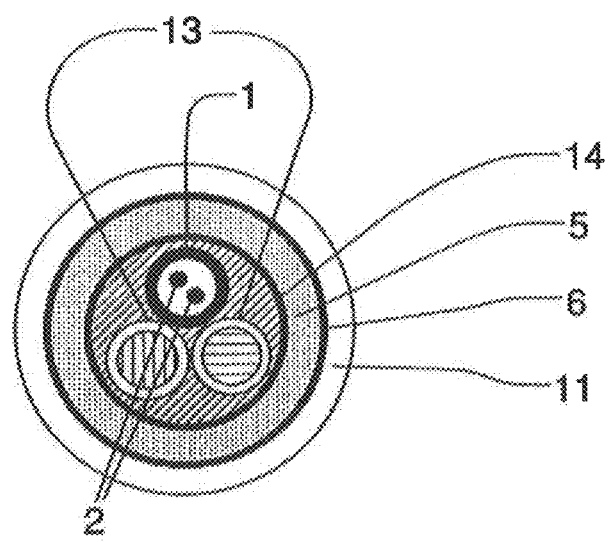
FIG. 6 shows a schematic cross-section through a sixth embodiment of a fiber-optic cable according to the present invention.

The embodiment of FIG. 6 includes a metallic tube 1, which may be formed like the tube of the first embodiment and also include one or more optical fibers 2 in its interior. Moreover, an additional filler material such as a gel may be provided in the cavity of the tube 1.

Two conductors 13 having conductor insulation and serving as electrical supply and return conductors, preferably made of copper, may be arranged in parallel with the tube 1. The conductor insulation may be made of a chemically resistant and temperature-resistant plastic, for example a fluoropolymer, preferably EPR or ETFE.

Also provided is stranded layer 14 surrounding the tube 1 and the two electrical conductors 13. Moreover, longitudinal fibers 5, preferably made of aramide and serving as reinforcing means and/or as strain relief elements, are provided outside the stranded layer 14.

Instead of the fibers 5, a two-layer or multi-layer stranded layer 5 with a left-hand and a right-hand lay may be provided.

A foil 6, which is preferably made of PETP and serves as stranding, is arranged outside the fibers 5. The foil 6 can serve as separating means or separating layer for mechanical decoupling.

The embodiment of FIG. 6 also includes an outer jacket 11 arranged outside the foil 6 and made of chemically resistant and temperature-resistant plastic, for example from fluoropolymer, preferably PEEK or ETFE, with a smooth surface.

Figure 7:
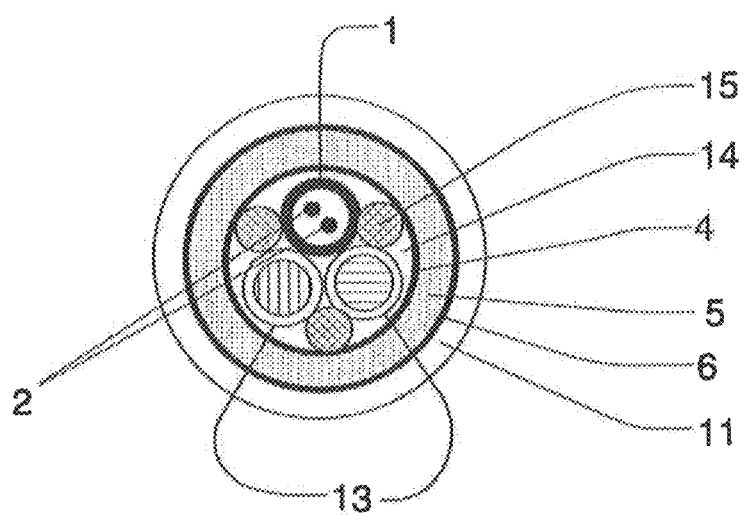
FIG. 7 shows a schematic cross-section through a seventh embodiment of a fiber-optic cable according to the present invention.

The embodiment shown in FIG. 7 includes a metallic tube 1, which can be constructed like the tube of the first embodiment and which can also have one or two more optical waveguides in its interior. Moreover, an additional filler material such as a gel can be provided in the cavity of the tube 1.

Two conductors 13 operating as electrical supply and return conductors and preferably made of copper are arranged in parallel with the tube 1. The conductor insulation may be made of a chemically resistant and temperature-resistant plastic, for example a fluoropolymer, preferably EPR or ETFE.

Furthermore, stress relief elements 15, preferably made of GFK and extending in parallel with the tubes 1 and the conductors 13, are provided. A fill material may be provided in the intermediate spaces between the tube 1, the conductors 13 and the stress relief elements 15.

Also provided are a stranded layer 14 surrounding the tube 1, the two electrical conductors 13 and the stress relief elements 15.

The seventh embodiment further includes a foil 4 arranged outside the stranded layer 14 for supporting the stranded layer. The foil 4 is preferably made of PTFE. The foil 4 can also be used as separating means or separating layer for mechanical decoupling.

In addition, longitudinal fibers 5, preferably made of aramide, are provided outside the foil 4, which serve as reinforcing means and/or as strain relief elements for the tube 1.

Instead of the fibers 5, a two-layer or multi-layer stranded layer may be provided with a left-hand and a right-hand lay.

Another foil 6 is provided outside the fibers 5 or outside two-layer stranded layer having the left-hand and a right-hand lay. The additional foil 6 can be configured as tape or have a longitudinal extent, and may preferably be made of PTFE. The additional foil 6 may also serve as separating means or separating layer for mechanical decoupling The embodiment according to FIG. 7 further includes an outer jacket 11 arranged outside the foil 6 and made of a chemically resistant and temperature-resistant plastic, for example, of fluoropolymer, preferably PEEK or ETFE, having a smooth surface.

The invention claimed is:
1. A fiber-optic cable comprising:
   at least one optical waveguide (2),
   at least one metallic tube (1) which at least partially surrounds the at least one optical waveguide (2),
   at least one additional layer, which at least partially surrounds the at least one tube (1),
   wherein the fiber-optic cable comprises a separator which contributes to or causes mechanical decoupling of the at least one tube (1) from the at least one additional layer, wherein at least one additional layer is configured as an electrical conductor (3, 12) and operates as a supply and/or return conductor; and wherein the fiber-optic cable comprises reinforcement, which serves as a strain relief and is arranged between the at least one metallic tube and the separator.

2. The fiber-optic cable according to claim 1, wherein the separator is formed as at least one foil (4, 6) disposed radially between the at least one tube (1) and the at least one additional layer.

3. The fiber-optic cable according to claim 1, wherein the reinforcement corresponds to the at least one additional layer or is formed as at least one additional layer.

4. The fiber-optic cable according to claim 1, wherein the separator is arranged between the at least one tube (1) and the reinforcement.

5. The fiber-optic cable according to claim 1, wherein the reinforcement comprises fibers (5, 8) or consists of fibers (5, 8).

6. The fiber-optic cable according to claim 1, wherein the reinforcement comprises at least one of aramide fibers, Zylon®, Dyneeema®, glass fibers or carbon fibers.

7. The fiber-optic cable according to claim 1, wherein the reinforcement is formed as reinforcement.

8. A fiber-optic cable comprising:
   at least one optical waveguide (2).
   at least one metallic tube (1) which at least partially surrounds the at least one optical waveguide (2),
   at least one additional layer, which at least partially surrounds the at least one tube (1),
   wherein the fiber-optic cable comprises a separator which contributes to or causes mechanical decoupling of individual components of the fiber-optic cable, wherein the separator comprises two foils (4, 6) between which an additional layer of the cable is disposed other than that of the separator.

9. The fiber-optic cable according to claim 8, wherein the innermost of the two foils (4, 6) indirectly or directly surrounds the tube (1).

10. The fiber-optic cable according to claim 8, wherein the reinforcement is disposed between the two foils (4, 6).

11. The fiber-optic cable according to claim 8, wherein the outermost of the two foils (4, 6) is surrounded by parts (10a, 10b) of a traction cable disposed radially outward of the reinforcement.

12. A fiber-optic cable comprising:
   at least one optical waveguide (2),
   at least one metallic tube (1) which at least partially surrounds the at least one optical waveguide (2),
   at least one additional layer, which at least partially surrounds the at least one tube (1),
   wherein the fiber-optic cable comprises a separator which contributes to or causes mechanical decoupling of individual components of the fiber-optic cable, wherein a conductor (3) is arranged on the outside of the tube (1) and in direct physical contact with the innermost of the two coils (4, 6).

13. The fiber-optic cable according to claim 1, wherein the fiber-optic cable is utilized in boreholes.

14. The fiber-optic cable according to claim 1, wherein the reinforcement consists of one of aramide fibers, Zylon®, Dyneema®, glass fibers or carbon fibers.

15. The fiber-optic cable according to claim 7, wherein the reinforcement is formed as a lay.

16. The fiber-optic cable according to claim 11, wherein the parts (10*a*, 10*b*) of the traction cable is conductive.

* * * * *